United States Patent
Zhou et al.

(10) Patent No.: US 8,567,748 B2
(45) Date of Patent: Oct. 29, 2013

(54) PROTECTIVE CASING

(75) Inventors: Cong-Bing Zhou, Shenzhen (CN);
Chia-Te Yu, New Taipei (TW);
Quan-Chang Cheng, Shenzhen (CN);
Lin-Lin Pan, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 58 days.

(21) Appl. No.: 13/221,910

(22) Filed: Aug. 31, 2011

(65) Prior Publication Data

US 2012/0145876 A1 Jun. 14, 2012

(30) Foreign Application Priority Data

Dec. 11, 2010 (CN) .......................... 2010 1 0583499

(51) Int. Cl.
*A47G 29/00* (2006.01)

(52) U.S. Cl.
USPC ........................................ 248/688; 248/676

(58) Field of Classification Search
USPC ......... 248/469, 472, 674, 676, 677, 686, 688, 248/918, 919, 922, 923
See application file for complete search history.

(56) References Cited

U.S. PATENT DOCUMENTS

| | | | |
|---|---|---|---|
| 5,732,928 A * | 3/1998 | Chang | 248/688 |
| 7,068,497 B2 * | 6/2006 | Chu | 361/679.06 |
| 7,573,703 B2 * | 8/2009 | Chuang et al. | 361/679.27 |
| 7,997,555 B2 * | 8/2011 | Lee et al. | 248/371 |
| 8,023,256 B2 * | 9/2011 | Walker et al. | 361/679.27 |
| 2009/0168334 A1 * | 7/2009 | Wang | 361/679.55 |
| 2010/0178963 A1 * | 7/2010 | Iwaki | 455/575.4 |
| 2010/0323771 A1 * | 12/2010 | Lai | 455/575.4 |

* cited by examiner

*Primary Examiner* — Gwendolyn Baxter
(74) *Attorney, Agent, or Firm* — Altis & Wispro Law Group, Inc.

(57) ABSTRACT

A protective casing includes a main body and a bracket. The main body defines two sliding grooves. The bracket for supporting the main body includes two support legs, one end of the two support legs pivots on the other, and the other ends of each support leg is capable of being slid in the two sliding grooves respectively so that an angle is formed between the two support legs.

19 Claims, 5 Drawing Sheets

PROTECTIVE CASING

BACKGROUND

1. Technical Field

The present disclosure relates to casings, and particularly to a case for protecting a portable electronic device.

2. Description of Related Art

Portable electronic devices, such as a mobile phone, a media player, and a personal digital assistant (PDA) are increasingly thinner and smaller. So the portable electronic device is easily damaged or abraded when it bumps against other objects.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
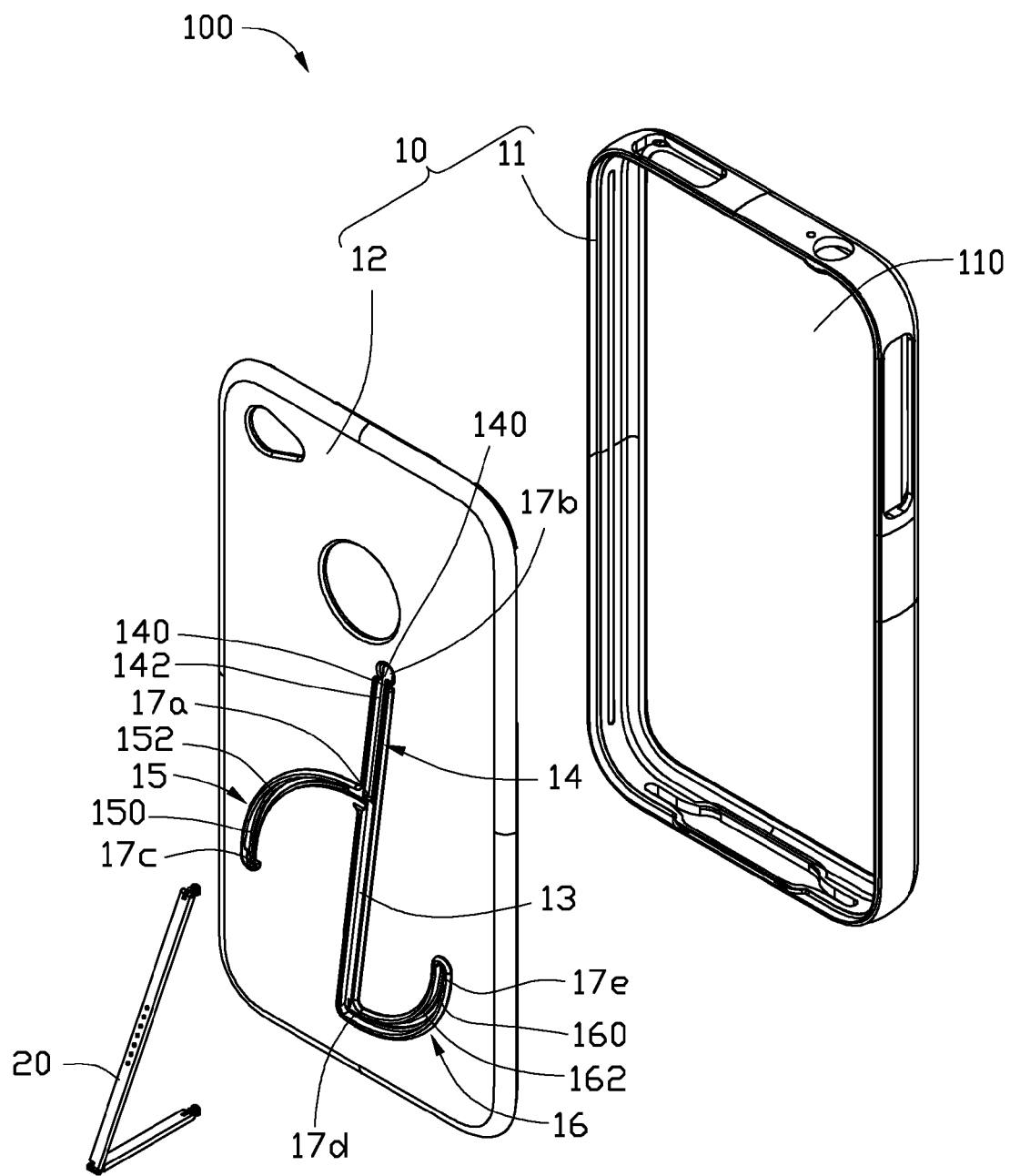
FIG. 1 is an exploded view of a protective casing having a bracket.

Referring to FIG. 1, a protective casing 100 includes a main body 10 and a bracket 20. The main body 10 is configured to attach to and protect a portable electronic device (not shown) to reduce damage caused by collisions and scrapes against other objects. The portable electronic device has a display (not shown). The bracket 20 is assembled to the main body 10 to support the portable electronic device received in the main body 10. In another embodiment, the protective casing 100 may be an outer shell of the portable electronic device.

The main body 10 includes a front cover 11 and a rear cover 12. The front cover 11 is attached to the rear cover 12. The front cover 11 defines an opening 110. The portable electronic device is received between the front cover 11 and the rear cover 12, and the display of the portable electronic device is exposed via the opening 110. The front cover 11 is made of soft and elastic material, so it is easy to put the portable electronic device into the main body 10, and scratches and scrapes caused by the cover 11 are avoided.

The rear cover 12 is made of rigid material. The rear cover 12 defines a slot 13, a first sliding groove 14, a second sliding groove 15, and a third sliding groove 16. The rear cover 12 further includes a first fixed portion 17a, a second fixed portion 17b, a third fixed portion 17c, a fourth fixed portion 17d, and a fifth fixed portion 17e. The first slide groove 14 communicates with the slot 13, and is positioned at one end of the slot 13. The longitudinal axis of the first slide groove 14 and the slot 13 are along the same straight line. This straight line diverges from the longitudinal centerline of the rear cover 12. The second sliding groove 15 and the third sliding groove 16 are positioned on the two opposite ends of the slot 13, and are curved. The curved line of each of the grooves 15 and 16 is substantially defined by a quarter circle arc drawn counter-clockwise from the same straight line along which the first groove 14 and the slot 13 are collinear. The centers of the circles of the grooves 15 and 16 are the same and located on the straight line mentioned above. The first fixed portion 17a is positioned on the junction of the slot 13 and the first sliding groove 14. The second fixed portion 17b is positioned at the free end of the first sliding groove 14. The third fixed portion 17c is positioned at the free end of the second sliding groove 15. The fourth fixed portion 17d and the fifth fixed portion 17e are positioned on the two opposite ends of the third sliding groove 16.

The slot 13 is formed on the exterior surface of the rear cover 12. The first sliding groove 14 is formed on the exterior surface of the rear cover 12. The base or bottom of the first sliding groove 14 defines a first hollow sliding path 140 between two first sliding tracks 142 which face each other.

The second sliding groove 15 is in a quarter circle arc shaped, the center of the circle of the second sliding groove 15 is positioned in the straight line on which the first sliding groove 14 and the slot 13 are on, and is formed on the exterior surface of the rear cover 12. The base or bottom of the second sliding groove 15 defines a second hollow path 150 and two second sliding tracks 152 which face each other. The second hollow path 150 communicates with the first hollow path 140. The second sliding track 152 and the first sliding track 142 have the same thickness.

The third sliding groove 16 is also in a quarter circle arc shaped, but the radius of the circle represented by the third sliding groove 16 is smaller than that of the second sliding groove 15. The third sliding groove 16 is formed on the exterior surface of the rear cover 12. The base or bottom of the third sliding groove 16 defines a third hollow path 160 and two third sliding tracks 162 which face each other.

The first fixed portion 17a defines a first fixed hole 170a (see FIG. 5) which is positioned on the junction between the first sliding groove 14 and the second sliding groove 15. The second fixed portion 17b, the third fixed portion 17c, the fourth fixed portion 17d, and the fifth fixed portion 17e have a concave shape on the exterior surface of the rear cover 12. The second fixed portion 17b, the third fixed portion 17c, the fourth fixed portion 17d, and the fifth fixed portion 17e respectively define a second fixed hole 170b, a third fixed hole 170c, a fourth fixed hole 170d, and a fifth fixed hole 170e. The first fixed hole 170a and the second fixed hole 170b both communicate with the first sliding groove 14. The third fixed hole 170c communicates with the second sliding groove 15. The fourth fixed hole 170d and the fifth fixed hole 170e both communicate with the third sliding groove 16, and the fourth fixed hole 170d is adjacent to the slot 13. The first fixed hole 170a and the fourth hole 170d are position on a first straight line which is collinear with the longitudinal line of the rear cover 12. The third fixed hole 170c and the fifth fixed hole 170e are positioned on a second straight line which is perpendicular to the longitudinal line of rear cover 12.

Figure 2:
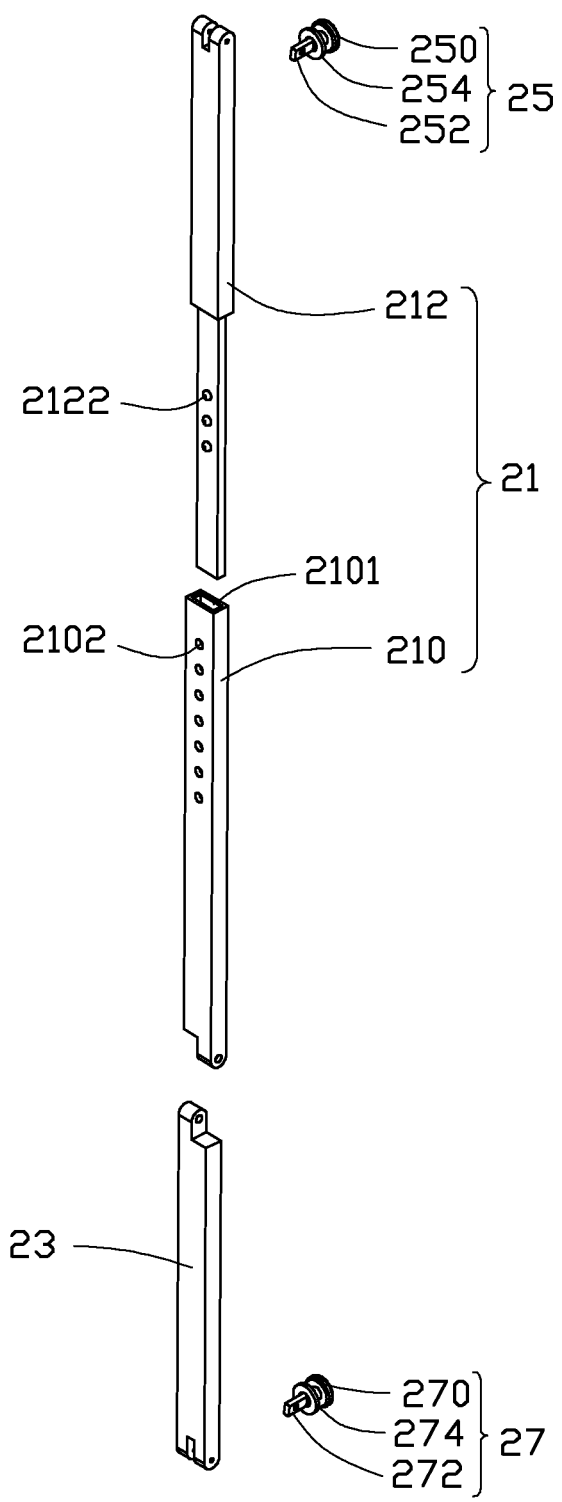
FIG. 2 is an exploded view of the bracket of FIG. 1.

Referring to FIG. 2, the bracket 20 includes a first support leg 21 and a second support leg 23. The first support leg 21 is pivotally joined to the second support leg 23. The first support leg 21 includes a first shank 210 and a second shank 212. A part of the second shank 212 is received in the first shank 210 and this part of the second shank 212 can be extended or retracted so that the effective length of the first support leg 21 is changeable. The sum of the length of the legs 21 and 23 is equal to the sum of the length of the slot 13 and the first sliding groove 14. Therefore, the legs 21 and 23 can be laid in one straight line flat against the rear cover 12. The distance between any position along the length of the second sliding groove 15 and any position along the length of the third sliding groove 16, is always smaller than the sum of the length of the first support leg 21 and the second support leg 23. As a result, the angle between the first support leg 21 and the second support leg 23 is always between 0-180 degrees if the first support leg 21 and the second support leg 23 are in place in the sliding grooves 15 and 16.

The first shank 210 is pivotally joined to the second support leg 23, to allow an angle between them. One end of the first shank 210 forms a receiving portion 2101. The receiving portion 2101 defines a plurality of clasping holes 2102. The clasping holes 2102 are arranged in a straight line along the longitudinal centerline of the first shank 210.

The second shank 212 has a connecting portion 2120 set on one end of it. The connecting portion 2120 is received in the receiving portion 2101 and can slide in the receiving portion 2101. The length of the connecting portion 2120 is not more than that of the receiving portion 2101. The first support leg 21 includes a plurality of protrusions 2122 corresponding with the plurality of clasping holes 2102. The length of the first support leg 21 can be changed by adjusting the relative positions of the connection portion 210 and the receiving portion 2101, and the overall length can be fixed by inserting bolt(s) or pin(s) through (some of) the protrusions 2122 and (some of) the clasping holes 2102.

The second shank 212 is pivotally connected to a first sliding member 25, and the first sliding member 25 is positioned on the other end opposite to the connecting portion 2120 of the second shank 212. The first sliding member 25 includes a first bottom part 250, a first pivot 252, and a first top part 254. One end of the first pivot 252 is coupled to the first bottom part 250, and the other end of the first pivot 252 is pivotally coupled to the second shank 212. The first top part 254 is sleeved on the first pivot 252 and can slide along the first pivot 252. If the first top part 254 slides to the second shank 212, the distance between the first bottom part 250 and the first top part 254 is at the maximum, and it is approximately equal to the thickness of the first sliding track 142 or the second sliding track 152. The cross-sectional size of the first top part 254 is smaller than that of the second fixed portion 17b or the third portion 17c. In another embodiment, the first sliding member 25 can also be coupled to the second shank 212 by screws, or other method of attachment.

The sum of the length of the second support leg 23 and the first shank 210 is equal to that of the slot 13. The second support leg 23 is pivotally coupled to a second sliding member 27, and the second sliding member 27 is disposed on one end away from the first shank 210 of the second support leg 23. The structure and size of the second sliding member 27 are approximately the same as those of the first sliding member 25. The second sliding member 27 includes a second bottom part 270, a second pivot 272, and a second top part 274. One end of the second pivot 272 is coupled to the first bottom part 250, and the other end of the second pivot 272 is pivotally coupled to the second support leg 23. The second top part 274 is sleeved on the second pivot 272 and can slide along the second pivot 272. If the first top part 274 slides to the second support leg 23, the distant between the second bottom part 270 and the second top part 274 is at the maximum, and it is approximately equal to the thickness of the third sliding track 162. The size of a cross section of the second top part 274 is smaller than that of the fourth fixed portion 17d or the fifth fixed portion 17e. In another embodiment, the second sliding member 27 can also be coupled to the second support leg 23 by screws, or other method of attachment.

To secure the bracket 20 to the rear cover 12, it is only necessary to respectively place the first sliding member 25 and the second sliding member 27 inside the first sliding groove 14 and the third sliding groove 16. Specifically, the first sliding member 25 is placed inside the first sliding groove 14 and likewise, the second sliding member 27 is placed inside the third sliding groove 16. By these means, the protective casing 100 is assembled.

Figure 3:
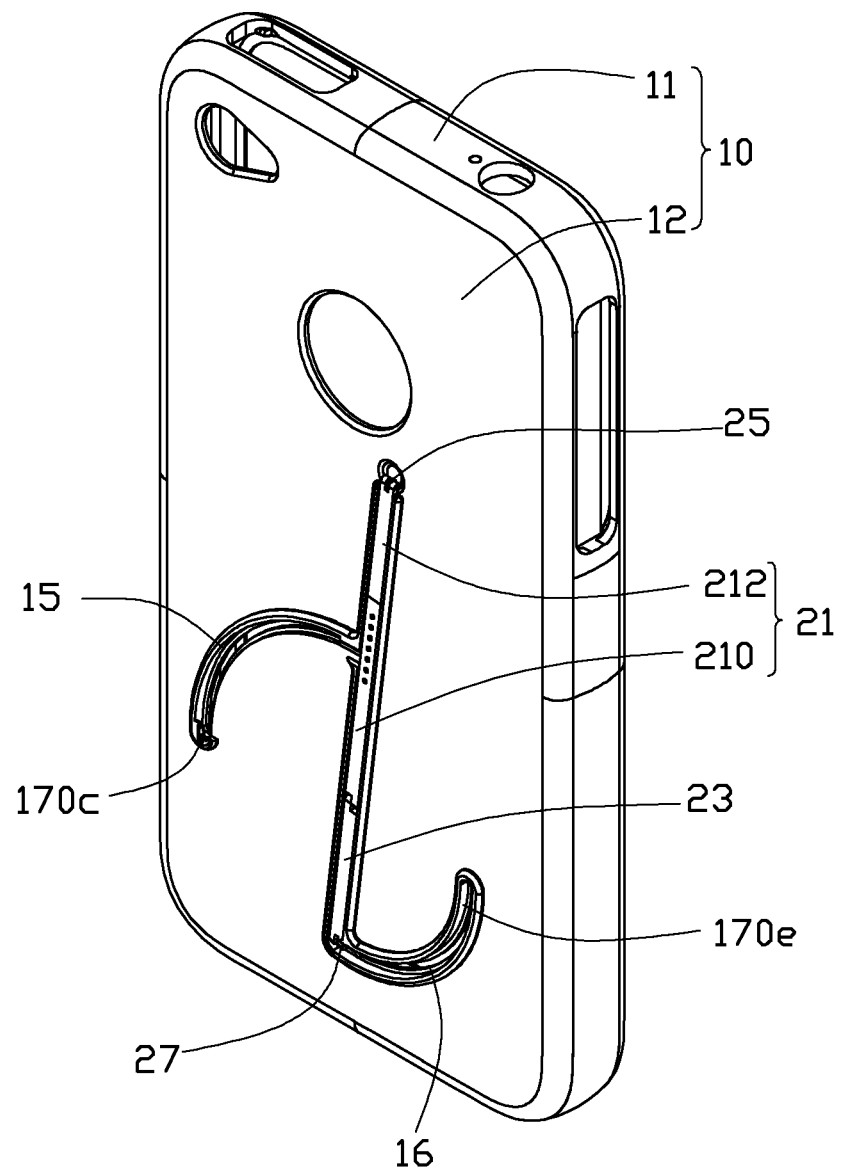
FIG. 3 is a first state of the bracket of the protective casing in FIG. 1.
Figure 4:
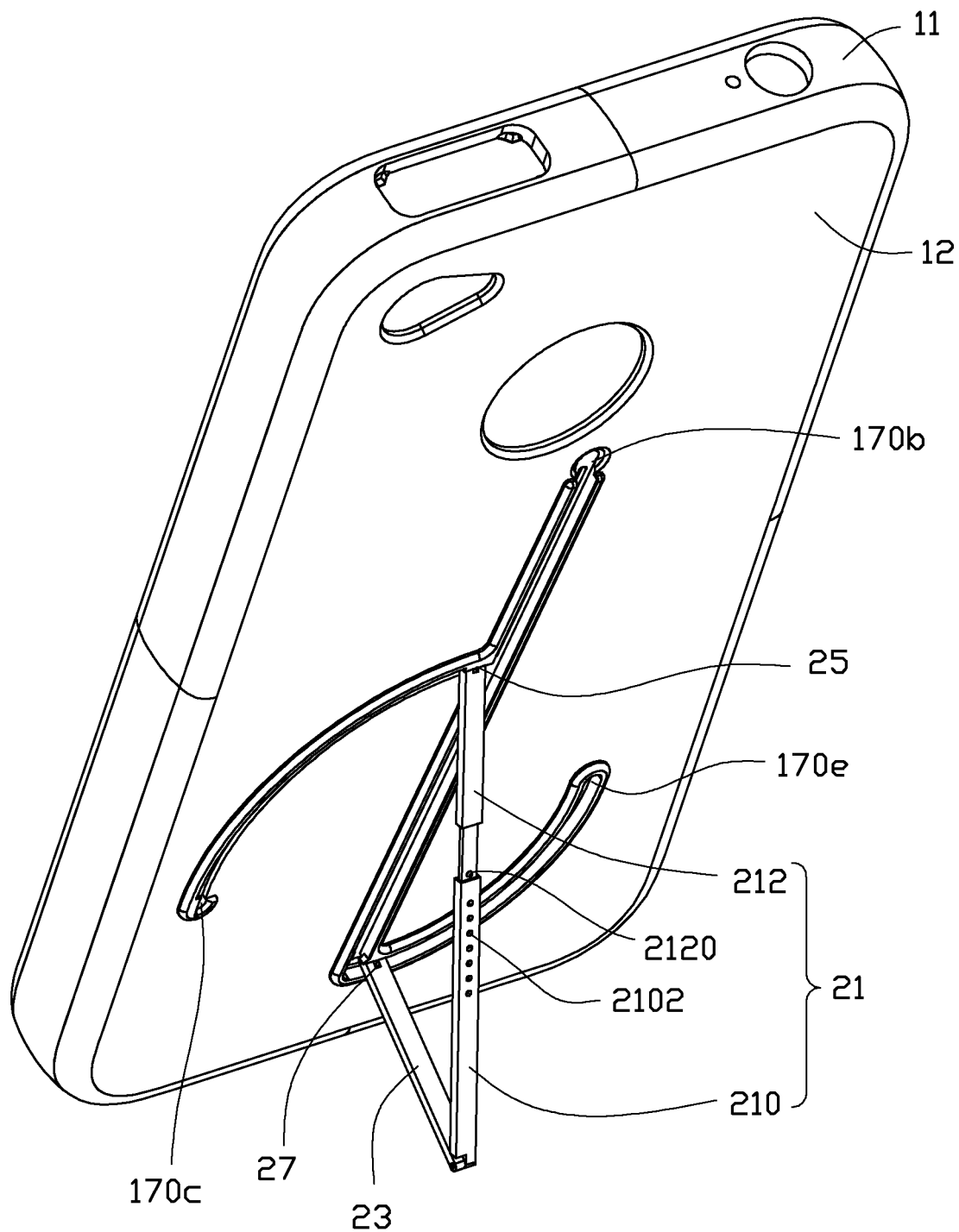
FIG. 4 is a second state of the bracket of the protective casing in FIG. 1.
Figure 5:
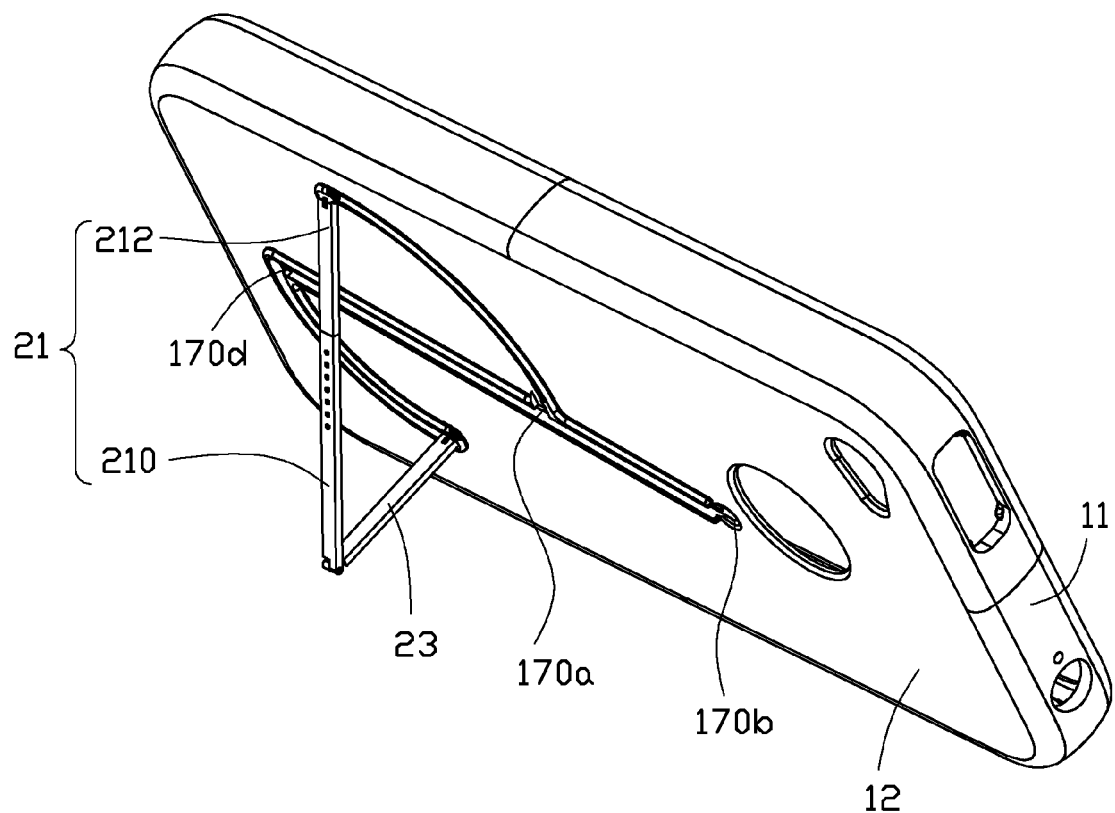
FIG. 5 is a third state of the bracket of the protective casing in FIG. 1.

Referring to FIG. 3 to FIG. 5, the states of the bracket 20 of the protective casing 100 are shown. The bracket 20 includes at least three states. The first state is that the bracket 20 is received in the main body 10 (shown as FIG. 3). The second state is that the bracket 20 supports the main body 10 in an upright manner (shown as FIG. 4). The third state is that the bracket 20 supports the main body 10 when lying on its side (shown as FIG. 5). The cooperation of the bracket 20 with the main body 10 under these three states of the bracket 20 will be described.

In the first state, the connecting portion 2120 of the second shaft 212 is completely received in the receiving portion 2101 of the first shaft 210 so that the length of the first support leg 21 is at the minimum. The first sliding member 25 slides to the end of the first sliding groove 14 which is away from the slot 13 then locates in the second fixed hole 17b. The second sliding member 27 slides to the end of the third sliding groove 16 then locates in the fourth fixed hole 17d. At this time, the angle between the first support leg 21 and the second support leg 23 is 180 degrees, that is to say the first support leg 21 and the second support leg 23 form one straight line, and the first support leg 21 and the second support leg 23 are both sunken in the slot 13 and the first sliding groove 14 respectively. As a result, the protective casing 100 is more easily handled and carried.

In the second state, the first sliding member 25 slides to the end of the first sliding groove 14 and is adjacent to the slot 13 and locates in the first fixed hole 170a, and the first sliding member 25 covers a part of the first fixed portion 17a. The second sliding member 27 slides to the end of the third sliding groove 16 and is adjacent to the slot 13. At this time, the angle between the first support leg 21 and the second support leg 23 is smaller than 180 degree, and the junction between the first support leg 21 and the second leg 23 forms a pivot (not labelled). If the protective casing 100 is placed on a flat surface, such as desk, the first sliding member 25, the second sliding member 27, the pivot, and the bottom surface of the protective casing 100 all support the main body 10. For example, if the portable electronic device is received in the main body 10, the portable electronic device is also supported. Further, the first sliding member 25 and the second sliding member 27 can be so placed that the main body 10 is stable and balanced if it is supported by the bracket 20. Moreover, the viewing angle of the portable electronic device can be adjusted by adjusting the length of the first support leg 21. For example, if the support leg 21 is lengthened, the viewing angle of the portable electronic device is smaller. On the other hand, if the support leg 21 is shortened, the viewing angle of the portable electronic device is larger.

In the third state, the first sliding member 25 slides to the end of the second sliding groove 15 which is away from the slot 13, and locates in the third fixed hole 170c. The second sliding member 27 slides to the end of the third sliding groove 16 which is away from the fifth fixed hole 170e. At this time, the angle of the first support leg 21 and the second support leg 23 is smaller than 180 degrees, and the junction between the first support leg 21 and the second leg 23 forms a pivot (not labelled). If the protecting case 100 is placed on the flat surface, the first sliding member 25, the second sliding member 27, the pivot, and one side surface of the protective casing 100 all support the main body 10. For example, if the portable electronic device is received in the main body 10, the portable electronic device is also supported. Further, if the first sliding member 25 and the second sliding member 27 are pushed along their respective tracks as far as they will go, that is to say, placed on a line perpendicular to the longitudinal centerline of the rear cover 12, the balance and stability of the main body 10 will be practically complete when supported by the bracket 20. Moreover, the viewing angle of the portable electronic device can be adjusted by adjusting the length of the first support leg 21. For example, if the support leg 21 is lengthened, the viewing angle of the portable electronic device is smaller. On the other hand, if the support leg 21 is shortened, the viewing angle of the portable electronic device is larger.

As described above, in the second and the third states of the bracket 20, the portable electronic device received in the protective casing 100 can be supported vertically or horizontally on a flat surface, and the viewing angle of the portable electronic device in these two orientations can be changed.

It is to be understood, however, that even though the information and advantages of the present embodiments have been set forth in the foregoing description, together with details of the functions of the present embodiments, the disclosure is illustrative only; and changes may be made in detail, especially in the matters of shape, size, and arrangement of parts within the principles of the present embodiments to the full extent indicated by the broad general meaning of the terms in which the appended claims are expressed.

What is claimed is:

1. A protective casing, comprising:
a main body comprising a first side and a second side different from the first side; the main body defines a first position, a second position, a third position, and a fourth position;
a bracket for supporting the main body, the bracket comprising a first support leg and a second support leg, one end of the first support leg pivoted to one end of the second support leg, a first free end of the first support leg away from the second support leg capable of being selectly placed at the first position and the second position, a second free end of the second support leg away from the first support leg capable of being selectly placed at the third position and the fourth position;
wherein the bracket and the first side combine together to support the main body when the first free end and the second free end are respectively positioned in the first position and the second position, and the bracket and the second side combine together to support the main body when the first free end and the second free end are respectively positioned in the second position and the fourth position.

2. The protective casing of claim 1, wherein a length of one of the first and the second support legs is changeable.

3. The protective casing of claim 1, wherein the first position and the third position defines a first straight line, the second position and fourth position defines a second straight line crossing the first straight line.

4. The protective casing of claim 3, wherein the main body defines a first sliding groove and a second sliding groove extending from the first position to the second position, the second sliding groove extends from the third position to the fourth position, the first free end is capable of sliding from the first position to the second position via the first groove, the second free end is capable of sliding from the third position to the second position via the second sliding groove.

5. The protective casing of claim 4, wherein the first and the second sliding grooves are quarter circle arcs drawn counterclockwise from the first straight line.

6. The protective casing of claim 4, wherein the main body further defines third sliding groove and a slot communicating with the third sliding groove, the third sliding groove and the slot combine together to receive the first support leg and the second support leg.

7. The protective casing of claim 6, wherein the first free end is capable of sliding from the first groove to one end of the third sliding groove which is away from the slot, the second free end is capable of moving from the second sliding groove to one end of the slot away from the third sliding groove, so as to enable the first support leg and the second leg being laid in the third sliding groove and the slot.

8. The protective casing of claim 6, wherein the second position is positioned at the other end of the third sliding groove connected to the slot, the third position is positioned at the end of the slot away from the third sliding groove.

9. The protective casing of claim 3, wherein a first angle is formed between the first support leg and the second support leg when the first free end is positioned at the first position and the second free end is positioned at the third position; a second angle different from the first angle is formed between the first support leg and the second support leg when the first free end is positioned at the second position and the fourth position.

10. The protective casing of claim 3, wherein the first side is longer than the second side.

11. A protective casing comprising a main body, wherein the main body defines a first sliding groove and a second sliding groove at interval, the first sliding groove and the second sliding groove are curved, and drawn counterclockwise from one straight line, a first line on which one end of the first sliding groove and one end of the second sliding groove are positioned is perpendicular to a second line on which the other end of the first sliding groove and the other end of the second sliding groove are positioned.

12. The protective casing of claim 11, wherein the first line is positioned in a longitudinal centerline of the main body.

13. The protective casing of claim 12, wherein the one straight line is at angle from the longitudinal centerline.

14. The protective casing of claim 13, wherein each of the first sliding groove and the second sliding groove is a quarter circle arc, and the centers of the circles of the first and second sliding grooves are the same and locate on the straight line.

15. The protective casing of claim 14, wherein a radius of the circle of the arc of the first sliding groove is larger than that of the second sliding groove.

16. The protective casing of claim 15, wherein the main body further defines a third sliding groove and a slot, the longitudinal axis of third sliding groove and that of the slot are on the one straight line, and the third sliding groove communicates with the slot, and the first sliding groove and the second sliding groove are from two opposite ends of the slot, and the first sliding groove communicates with the third groove.

17. The protective casing of claim 16, wherein the main body comprises four fixed portions positioned at the one ends and the other ends of the first sliding groove and the second sliding groove respectively, each of the four fixed portion define a fixed hole.

18. The protective casing of claim 17, further comprises a bracket for supporting the main body, wherein the bracket comprises two support legs, one end of the two support legs pivotally joined to each other, and the other ends of the two support legs is capable of sliding in the two sliding grooves respectively so that an angle is formed between them.

19. A protective casing comprising:
a main body, and
a bracket installed on the main body, the bracket comprising a first support leg and a second support leg being pivotally connected together to allow an angle between them, the free ends of the first support leg and the second support leg being installed on the main body; wherein the main body is placed on a flat surface with one side of the main body, and a junction between the first support leg and the second support leg placing on the flat surface; and an angle formed between the main body and the flat surface is changeable, a length of the first support leg is changable to enable the angle formed between the main body and the object to change.

* * * * *